I. WOLARSKY

LIGHTING FIXTURE SHADE HOLDER

Feb. 24, 1931.

Re. 17,979

Original Filed March 2, 1929

INVENTOR
*Isidore Wolarsky*
BY
*John M. Cole*
ATTORNEY

Reissued Feb. 24, 1931

Re. 17,979

UNITED STATES PATENT OFFICE

ISIDORE WOLARSKY, OF MOUNT VERNON, NEW YORK

LIGHTING-FIXTURE SHADE HOLDER

Original No. 1,761,511, dated June 3, 1930, Serial No. 344,084, filed March 2, 1929. Application for reissue filed November 22, 1930. Serial No. 497,590.

The present invention relates to lighting fixture shade holders and is more particularly directed toward devices for holding shades or globes in kitchen units, commercial lighting fixtures and the like, which employ shades or globes having fairly large necks.

Glassware of the type employed in these fixtures is generally provided with a lip or bead about the upper part or neck of the globe or shade, and it has heretofore been the practice to support such shades by devices engageable with such lip or bead. These shades are made to have various normal sizes dependent upon the size of the unit and fitter which is to be employed. It is, however, impossible in manufacturing glassware to have the glass parts made accurately to size and as a result of this difficulty shades or globes of the same nominal size made by various manufacturers may vary as much as 3/8″ in size.

Inasmuch as these shades, in the larger sizes, are quite heavy, it is essential in a satisfactory shade holder to insure that there is no possibility of the shade becoming loose after it has been secured in place; and the present invention contemplates a positive lock in the same whereby the shade is securely held in place and it cannot force the shade-holding devices to a position to permit the shade to loosen.

According to the present invention the shade receiving skirt or band of the fixture carries shade supporting devices which include a spring protractable plunger to engage the shade and an externally accessible knob or other similar device to retract the plunger to release the shade. The device may have a knob controlled interlock to secure the plunger in protracted position so that the shade lip cannot cam it outwardly, and/or the entire device may be bodily adjustable to compensate for variations in size of shade lips.

The accompanying drawings show, for purposes of illustration, several of the many possible embodiments in which the present invention may take form, it being understood that these drawings are illustrative of the invention rather than limiting the same.

Figure 1:
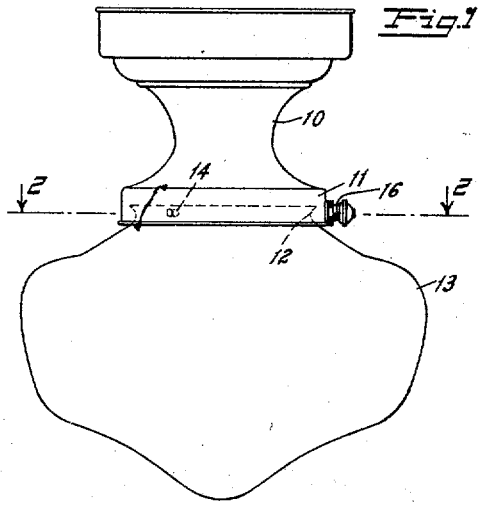
Figure 1 is an elevational view of an enclosed lighting unit.
Figure 2:
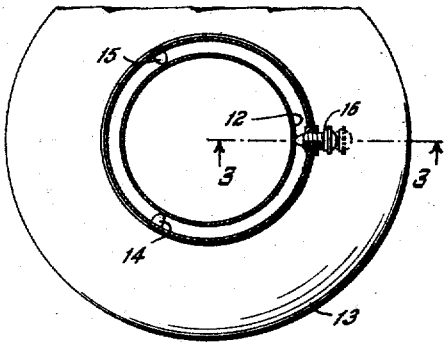
Figure 2 is a section taken at line 2—2 of Figure 1.

A typical enclosed lighting unit, as illustrated in Figure 1, contains a support 10 which may be made of stamped sheet metal, porcelain, or other material which is employed in such devices. It has a shade receiving skirt or band adapted to receive the neck or lip 12 of a shade or globe 13.

Figure 4:
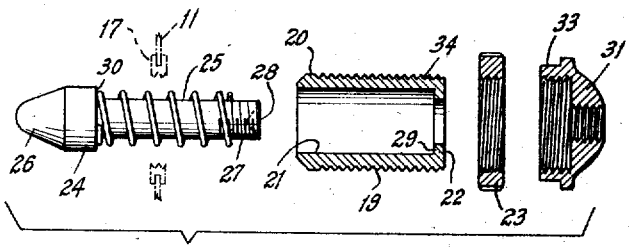
Figure 4 is a sectional view illustrating the component parts of the device illustrated in Figure 3.
Figure 3:
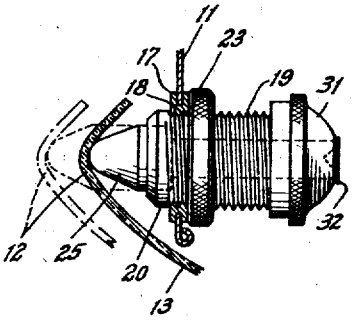
Figure 3 is an enlarged vertical sectional view on the line 3—3 of Figure 2.

The shade is supported by shade supporting devices 14, 15 and 16. The devices 14 and 15 may be pressed in from the skirt, formed integral with it, or in the form of lugs soldered or riveted to the skirt. These two devices are generally fixed in position and are adapted to receive the bead or lip of the shade opposite the device 16. The shade supporting device 16 is of special construction and is adapted to releasably hold the shade in place and to securely lock it in place. The details of the construction of one form of shade holding device are shown in Figures 3 and 4.

The skirt or fixture body 11 carries a threaded bushing 17. This bushing may be secured in place by soldering or riveting and may for example be threaded to have 1/8″ pipe threads as indicated at 18. This bushing is adapted to receive a tubular member 19 externally threaded as indicated. The threads on this tubular member preferably do not extend the full length of the member. They are preferably cut short slightly at the left or inner end, as indicated at 20, thereby making it impossible to completely thread the member 19 through the bushing. This tubular member has an inner chamber 21 and an apertured end wall 22. The barrel or tubular member 20 is threaded into the bushing 18 from the inside of the skirt and the lock-washer 23 is threaded on to the tubular member from the left, the lock-washer being preferably brought against the bushing to secure the tubular member in place.

The tubular member 19 is adapted to receive a plunger 24 and coiled spring 25. The inner end of the plunger 24 has a rounded nose or tip 26, while the outer end is threaded as indicated at 27, and may be provided with a recess 28. The plunger is adapted to be passed into the tubular member or barrel 19 from the left or inside as indicated in Figure 4, so that the spring 25 is housed between the shoulders 29 and 30. The smaller threaded end of the plunger passes out through the hole in the barrel 19, and a knob or end cap 31 is threaded on to the plunger. In order that the end cap cannot be accidentally removed, the end of the plunger is upset as indicated at 32. The knob 31 is an internally threaded portion 33, adapted to be threaded on to the end 34 of the barrel or tubular member 20.

The device shown in Figures 3 and 4 operates as follows: The complete device 16 is constructed to permit threading the barrel or tubular member 19 back and forth in the bushing 18 and securing it in place by the lock-washer or nut 23. In this manner one is able to compensate for considerable variation in the size of the beads or lips on shade-holders of the same nominal size. Such a range of adustment is indicated by the full line and dotted line positions in Figure 3. When the lock nut is thus tightened and the barrel secured in fixed body, one can operate the plunger 25 by turning it backward enough to unthread the knob or cap 31 from the end of the barrel and can then pull the plunger out sufficiently to permit lowering the shade. When the shade is replaced, the plunger is withdrawn and shade raised to position and then the pressure released to permit the plunger to close in against the shade. The cap is given a slight turn so as to thread it on to the barrel and this effectively resists any tendency to push the plunger out. The weight of the shade, acting through the lip, exerts a considerable horizontal force tending to move the plunger outwardly. This force is so great in heavy shades that it would be inconvenient to provide a strong enough coil spring to resist the same.

Figure 5:
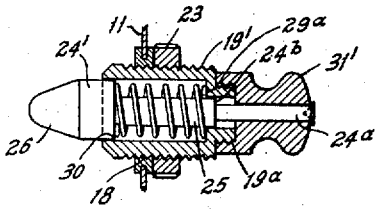
Figure 5 is an assembly view of a slightly modified form of construction.

In the modified form of construction indicated in Figure 5, the parts are somewhat the same as above described in detail. The barrel 19′ has a reduced end portion 19ᵃ threaded as indicated. The plunger 24′ has a reduced end portion 24ᵃ adapted to pass into the smooth hole drilled in the knob or cap 31. The plunger 24′ also has a shoulder 24ᵇ normally spaced a slight distance from the shoulder 29′ of the barrel 19′. In this form of construction the knob 31′ is made small enough to permit passing the washer 23 over it so that it can be threaded on to the barrel 19′. The lost motion connection between the shoulder 24ᵇ and 29′ makes it possible to turn the knob 31′ on the threads without pushing the plunger inwardly. This eliminates the possibility of exerting undue pressure on the globe or shade when the knob is given the final turn which prevents the plunger from being pushed out from the inside. This form of construction also has the advantage of making it possible to completely assemble the tubular member and enclosed parts. They may then be threaded as a unit into the bushing 18 and the lock-washer 23 threaded on to the barrel to lock the parts in place. With this form of construction it is unnecessary for the fixture manufacturer to disassemble the parts.

Figure 6:
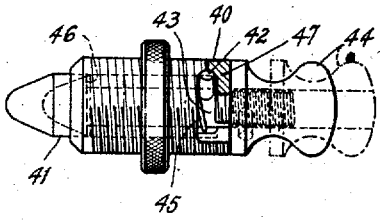
Figure 6 is an elevational view of a still further modified form of construction.

In the form of construction shown in Figure 6, the barrel or tubular member 40 is preferably threaded for the entire length, the same as the barrel 19. The plunger 41 is provided with a pin 42 adapted to enter the slot 43 in the barrel. The plunger 41 is also threaded into a knob 44 and is surrounded by a coiled spring 45 which is held between a shoulder 46 on the plunger and the flange 47 on the end of the barrel. This device may be threaded into the bushing 18 in the same manner as previously described and may be adjusted to proper position as above set forth. In this form of construction the knob may be pulled out when the plunger is turned to bring the pin to the open part of the slot 43, and the plunger may be locked against axial movement by turning the plunger to bring the pin to the position as indicated in the full lines in the drawing.

This bayonet slot arrangement is, however, somewhat more expensive to manufacture and has the disadvantage relative to the threaded interlock, that it is somewhat more difficult to locate the slot than the threads. Furthermore, the knob and plunger move as a unit and there is no opportunity for the lost motion arrangement of Figure 5.

Where there is no objection to the possibility of completely unthreading these devices, one can cut the threads on the entire length of the tubular member, or in the case of the barrel 40, the threading may be stopped near the slot 43. The devices may then be threaded in and out from the outside.

The devices which have been above described are well suited for the purpose of supporting various sized shades or globes. The parts may be made on a screw machine and those of the type shown in Figures 5 and 6 may be readily assembled with the fixture canopy by the manufacturer. The parts are assembled as above described and the purchaser of the canopy may then adjust the holder 16 according to the size of shade or globe which happens to be used in the particular fixture. The shade may be easily released when it is desired to do so. There is no possibility of accidentally releasing it.

What is claimed is:

1. In a lighting fixture, a support for shades of the type having a lip, comprising, a shade receiving band adapted to receive the lip of the shade and having a threaded aperture therein, a tubular member threaded into said aperture, and a spring pressed plunger carried in the tubular member and provided with an externally accessible knob and a shade engaging tip, the member being adjustable by threading it in the aperture to compensate for variations in the size of shades, the plunger being capable of being withdrawn by the knob to allow the lip on the shade to pass by the plunger tip.

2. In a lighting fixture, a support for shades of the type having a lip, comprising, a shade receiving band adapted to receive the lip of the shade and having a threaded aperture therein, a tubular member threaded into said aperture from the inside of the band, the threaded member having an abutment to prevent threading the member all the way through the aperture, a lock nut threaded on the member for securing it in place, and a spring pressed plunger carried in the tubular member and provided with an externally accessible knob and a shade engaging tip, the member being adjustable by threading it in the aperture to compensate for variations in the size of shade, the plunger being capable of being withdrawn by the knob to allow the lip on the shade to pass by the plunger tip.

3. In a lighting fixture, a support for shades of the type having a lip, comprising, a shade receiving band adapted to receive the lip of the shade and having a threaded aperture therein, a tubular member threaded into said aperture, a spring pressed plunger carried in the tubular member and provided with an externally accessible knob and a shade engaging tip, the member being adjustable by threading it in the aperture to compensate for variations in the size of shades, the plunger being capable of being withdrawn by the knob to allow the lip on the shade to pass by the plunger tip, and a knob controlled locking device for interlocking the plunger and tubular member to prevent forcing the plunger outward.

4. In a lighting fixture, a support for shades of the type having a lip, comprising, a shade receiving band adapted to receive the lip of the shade and having a threaded aperture therein, a tubular member threaded into said aperture, and a spring pressed plunger carried in the tubular member and provided with an externally accessible knob and a shade engaging tip, the member being adjustable by threaded it in the aperture to compensate for variations in the size of shades, the plunger being capable of being withdrawn by the knob to allow the lip on the shade to pass by the plunger tip, the tubular member and knob having cooperative threads adapted to be brought into threaded engagement when the plunger is in its inner position for holding the plunger against axial movement.

5. In a lighting fixture, a support for shades of the type having a lip, comprising, a shade receiving band adapted to receive the lip of the shade and having a threaded aperture therein, a tubular member threaded into said aperture, and a spring pressed plunger carried in the tubular member and provided with an externally accessible knob and a shade engaging tip, the member being adjustable by threading it in the aperture to compensate for variations in the size of shades, the plunger being capable of being withdrawn by the knob to allow the lip on the shade to pass by the plunger tip, the tubular member and knob having cooperative threads adapted to be brought into threaded engagement when the plunger is in its inner position for holding the plunger against axial movement, there being a lost motion connection between the knob and plunger to permit threading the knob onto the tubular member without moving the plunger tip further toward the shade.

6. A shade holding device for use with shade receiving supports having threaded apertures, comprising an externally threaded barrel adapted to be threaded into such apertures and having an interiorly disposed apertured flange at its outer end, a plunger carried in said barrel and having a shade engaging tip, a coiled spring interposed between the flange and a shoulder on the plunger and tending to protract the plunger, and a knob connected to the plunger to retract the plunger, the shade holding device being adjustable for variations in size of shade by turning it in the threaded aperture.

7. A shade holding device for use with shade receiving supports having threaded apertures, comprising an externally threaded barrel adapted to be threaded into such apertures and having an interiorly disposed apertured flange at its outer end, a plunger carried in said barrel and having a shade engaging tip, a coiled spring interposed between the flange and a shoulder on the plunger and tending to protract the plunger, a knob connected to the plunger to retract the plunger, and a knob controlled locking device interposed between the plunger and barrel for preventing axial movement of the plunger, the shade holding device being adjustable for variations in size of shade by turning it in the threaded aperture.

8. A shade holding device for use with shade receiving supports having threaded apertures, comprising an externally threaded barrel adapted to be threaded into such apertures and having an interiorly disposed apertured flange at its outer end, a plunger carried in said barrel and having a shade engaging tip, a coiled spring interposed between the flange and a shoulder on the plunger and tending to protract the plunger, and a knob connected to the plunger to retract the plunger, the barrel and knob having cooperative threads adapted to be brought into threaded engagement when the plunger is in its inner position for holding the plunger against axial movement, the shade holding device being adjustable for variations in size of shade by turning it in the threaded aperture.

9. A shade holding device for use with shade receiving supports having threaded apertures, comprising an externally threaded barrel adapted to be threaded into such apertures and having an interiorly disposed apertured flange at its outer end, a plunger carried in said barrel and having a shade engaging tip, a coiled spring interposed between the flange and a shoulder on the plunger and tending to protract the plunger, and a knob having a lost motion connection with the plunger and adapted to retract the plunger, the knob and barrel having cooperative threads adapted to be brought into threaded engagement when the plunger is in its inner position for holding the plunger against axial movement, the lost motion connection permitting threading the knob into the tubular member without moving the plunger tip to exert pressure on the shade, the shade holding device being adjustable for variations in size of shade by turning it in the threaded aperture.

10. A shade holding device for use with shade receiving supports having threaded apertures, comprising an externally threaded barrel adapted to be threaded into such apertures and having an interiorly disposed apertured flange at its outer end, a plunger carried in said barrel and having a shade engaging tip, a coiled spring interposed between the flange and a shoulder on the plunger and tending to protract the plunger, the plunger having a reduced outer end, and a knob permanently secured thereon by upsetting the extreme end of the plunger, the knob being adapted to retract the plunger, the knob and barrel having threads whereby these parts may be secured together to prevent axial movement of the plunger.

11. A shade holding device for use with shade receiving supports having threaded apertures, comprising an externally threaded barrel adapted to be threaded into such apertures and having an interiorly disposed apertured flange at its outer end, a plunger carried in said barrel and having a shade engaging tip, a coiled spring interposed between the flange and a shoulder on the plunger and tending to protract the plunger, the plunger having a reduced outer end, and a knob slidably carried in said outer end and permanently secured thereon by upsetting the extreme end of the plunger, the knob being adapted to retract the plunger, the knob and barrel having threads whereby these parts may be secured together to prevent axial movement of the plunger, the slidability of the knob on the plunger allowing the knob and barrel to be threaded together without exerting pressure on a shade.

12. In a lighting fixture, a support for shades of the type having a lip, comprising, a shade receiving band, a reciprocatory plunger carried in an externally threaded barrel supported by the band, a spring to urge the plunger toward the shade lip, and a knob connected to the plunger and threaded to receive the threaded portion of the barrel, the knob, when unthreaded from the barrel, being effective to withdraw the plunger from the shade, the parts when threaded together acting to prevent axial movement of the plunger so that is cannot be forced outwardly by the shade.

13. In a lighting fixture, a support for shades of the type having a lip, comprising, a shade receiving band, a reciprocatory plunger carried thereby and having a spring to urge it toward the shade lip, an externally disposed knob for pulling the plunger away from the shade, a relatively fixed, threaded member supported from the band adjacent the knob and concentric with the plunger, and threads on the knob for cooperating with the threads on the threaded member for securing the knob to the plunger whereby the plunger cannot be forced outwardly to release the shade.

14. In a lighting fixture, a support having a shade receiving skirt, a shade having a lip adapted to be received in said skirt, and shade supporting devices carried by the skirt, said devices including a spring protractable plunger to engage the shade, an externally accessible knob for retracting the plunger to release the shade, a fixed threaded member about the exposed end of the plunger, and threads on the knob for securing the knob to the threaded member so that the knob and plunger cannot be forced outwardly to release the shade.

15. In a lighting fixture, a support having a shade receiving skirt, a shade having a lip adapted to be received in said skirt, and shade supporting devices carried by the skirt, said devices including a spring protractable plunger to engage the shade, an externally accessible knob for retracting the plunger to release the shade, a fixed member about the exposed end of the plunger and provided with a few turns of complete screw threads, and cooperative complete screw threads carried by the knob, the threads being brought together by a simple turning movement of the knob and acting to lock the knob to the threaded member to prevent accidental release of the shade.

ISIDORE WOLARSKY.